3,207,712
PROCESS FOR THE PRODUCTION OF EXPANDABLE PARTICLES OF STYRENE POLYMER
Eugene D. Andrews, Wexford, Daniel V. Francis, Pittsburgh, and Daniel J. Rode, Coraopolis, Pa., assignors to Koppers Company, Inc., a corporation of Delaware
No Drawing. Filed Dec. 8, 1961, Ser. No. 158,117
1 Claim. (Cl. 260—2.5)

This invention relates to the production of cellular polymers.

A convenient way to make expandable polymeric particles is to polymerize a styrene monomer by suspension polymerization to form a stabilized aqueous suspension of styrene polymer particles, then to contact the suspension at about 90° C. with a normally liquid aliphatic hydrocarbon that boils within the range of 10–100° C. until the hydrocarbon is integrated into the polymeric particles, and thereafter cool the suspension and separate these particles from the suspension. Reference is made to D'Alelio Patent No. 2,983,692 for a more detailed description of the process. When such particles are subjected to heat, the particles expand to from ten to thirty times their original volume. Conventionally, the particles are heated by steam, hot water or air in a confining mold to provide an article having a foamed polymeric structure and conforming to the shape of the mold. Usually, the particles are partially expanded or "pre-expanded" without restraint, for example, as described in copending application Serial No. 689,195 by Hugh Rodman, Jr., now Patent No. 3,023,175, and thereafter further expanded with restraint in a mold. Such articles of foamed styrene polymeric structure find wide use as novelties, insulations and the like.

It has been recognized that the foamed structure has better qualities when the cell size of the expanded particles is small. When the cell size is large, the particles have an irregular, frosty or glassy texture. The adverse effects of large cell size also manifest itself in the pre-expansion of the particles and in the moldability and quality of the molded part. Such effects include poor storage life of pre-expanded beads, shrinkage of pre-expanded particles, over-sensitivity of the pre-expanded particle to heat, poor fusion of the particles upon molding, inability to produce articles having a low density, shrinkage of the article from the mold, and poor dimensional stability for the final article.

The term "crystallinity," which has frequently been associated with poor cell size, is applied to a coarse, cellophane-like, glossy foam structure with cells greater than 10 mils in diameter. The presence of large surface cells imparts a frosted or crystallin sparkle to the pre-expanded beads or molded objects. Thus, a high degree of crystallinity or large surface cells is generally not desirable.

This invention contemplates a process for producing expandable polymeric particles that will yield foamed structures of improved cellular characteristics. Such particles, when expanded, have a satin-like texture.

In the process described above for producing expandable styrene polymers, the cooling of the slurry after the expanding agent has been incorporated into the styrene polymer is effected by flowing water through the walls of the reaction vessel. Such cooling of the slurry from 90–110° C. to 35–40° C. normally requires two to three hours. While the expandable styrene polymer product is satisfactory for most purposes, it does not have the desired small cell size at the surface of the expanded particles.

Unexpectedly it has now been found that rapid cooling of the polymeric particles immediately after the expanding agent has been incorporated within the particles yields a particle which, after expansion by heat, has a surface of satin-like texture. The surface is particularly characterized by cells of small size. Such small cell sizes extend several layers or cells deep within the particle; in fact, the cell structure throughout the particle is improved.

It has now been found that, immediately after the expanding agent has been incorporated into the polymeric particle, the rate of cooling of the slurry, the temperature level to which this cooling is carried, and the length of time at which the particles remain at this low temperature level are critical in the production of expandable polymeric particles that, upon expansion, will have extremely small cell size.

The phenomena invoved is not clearly understood; it could possibly be explained by a number of different mechanisms. One postulation is that the rapid cooling (particularly through the second order of transition temperature or glass transition temperature, which for a polystyrene-normal pentane solution is about 82° C.) and the time at an effective low temperature level could induce precipitation of the hydrocarbon blowing agent from solid solution, thus creating nucleating points for subsequent cell formation upon the application of heat during pre-expansion. The mechanism may be comparable to the principles of crystallization whereby rapid cooling results in formation of finer crystals. The rapid cooling may also have the effect of solidifying the polymer, particularly the bead's outer shell area, in such a manner as to induce molecular strains which serve to provide multiple centers for cell formation.

The invention will be illustrated further by the following example.

The procedure outlined in D'Alelio Patent No. 2,983,692 was generally followed in that 3.72 parts of a tricalcium phosphate (comprised of about 50 parts tricalcium phosphate monohydrate and 50 parts hydroxy apatite) was added along with 354 parts of deionized water to a kettle equipped with a stirrer. The system was purged with nitrogen. There is then added with nitrogen purging 428 parts styrene containing 0.868 part benzoyl peroxide and 0.189 part tertiary-butyl perbenzoate. Stirring is commenced and there is added 0.0164 part Nacconol sodium dodecylbenzene sulfonate. The system is heated over a period of approximately 1¼ hours to approximately 90° C. and held there for approximately 6½ hours. Thereafter the temperature is raised over a period of approximately ¾ hour to 115° C. and held there for 3 hours after which the temperature is reduced to 90° C. There is added under pressure 47.6 parts petroleum ether boiling in the range 35–65° C. and the system maintained at 90° C. at approximately 60–70 pounds per square inch for 4 hours. The suspension was divided into two aliquots, A and B.

Aliquot A was cooled by drowning the hot slurry in a bath of water at a temperature of 15–20° C. The beads were separated by centrifuging and washed with dilute hydrochloric acid.

Aliquot B was cooled by circulating water at an inlet temperature of 15° C. in the jacket of the reactor. This cooling required a period of 2½ hours at which time the slurry had been cooled to 35–40° C. The beads were separated from the liquid medium by centrifuging and the beads washed with dilute hydrochloric acid.

The beads from Aliquot A were pre-expanded in a Rodman pre-expander (described in the aforesaid patent No. 3,023,175) to a bulk density of 1 pound per cubic foot. The resulting pre-expanded beads had a satin-like texture. The size of surface cells of the individual particles ranged from 0.1–2 mils.

A quantity of beads from Aliquot B were pre-expanded in a Rodman pre-expander as with Aliquot A to a bulk density of 1 pound per cubic foot. The resulting pre-expanded beads had a frosty texture. The size of the surface cells ranged from 4–30 mils.

A second quantity of beads from Aliquot B were cooled in ice water to a temperature of 10° C. These beads were then separated from the water by contrifuging. The beads were then pre-expanded in a Rodman pre-expander as was the first quantity from Aliquot B. There was no discernible change in the beads from that of the first quantity.

The foregoing pre-expanded beads from Aliquot A were fed to a vented mold until the mold was substantially filled with the beads. The mold was closed and steam introduced therein for ten minutes. The mold was then cooled, opened and the product removed. The product had a cellular structure, a density of about 1 pound per cubic foot, and still retained a satiny surface characteristic. The beads from Aliquot B, when molded in the same manner, presented a crystallin surface.

It has been found that the slurry containing the beads with the expanding agent incorporated therein should be cooled from the incorporating temperature of 90–100° to 5–25° C. in less than fifteen minutes. The beads so produced have extremely small cells in the bead surface. These small cell sizes extend to a considerable depth through the beads. In fact, with respect to the beads which have been cooled at a conventional rate, the whole cell size of the bead is reduced.

As used herein, the term styrene polymer is intended to include homopolymers of styrene and copolymers of styrene that contain more than 50% and preferably more than 75 weight percent by weight of styrene. Examples of monomers that may be copolymerized with the styrene monomer include the conjugated 1,3-dienes, e.g., butadiene, isoprene, etc., alpha, beta-unsaturated monocarboxylic acids and derivatives thereof, e.g., acrylic acid, methyl acylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. Also included are blends of the styrene polymer with other polymers, such as blends of styrene polymer with rubbery diene polymers or the analogous compositions obtained by dissolving a rubbery diene polymer in styrene monomer and subsequently polymerizing the mixture, an example being "impact" polystyrene which is an admixture of polystyrene with an elastomer, such as for example a styrene-butadiene copolymer. All or a portion of the styrene may be replaced with its closely related homologues such as alpha-methylstyrene, o-, m-, and p-ethylstyrenes, o-, m-, and p-methylstyrenes, 2,4-dimethylstyrene.

The expanding agents incorporated in the styrene polymer are aliphatic hydrocarbons boiling within the range of about 10° C. to about 100°. Useful expanding agents include, for example, pentane, hexane, heptane, cyclopentane, cyclopentadiene, and petroleum ethers that boil within the indicated range. Mixtures of two or more expanding agents may be used if desired. Usually 4 to 30 parts by weight of expanding agent is employed per 100 parts of styrene polymer.

The foregoing has illustrated a preferred embodiment of the invention wherein polymeric particles containing an expanding agent have been shock cooled to produce particles which, when heated, have the characteristic of small cells at the surface of the particles. It will be recognized, however, that any of the conventional suspension systems for styrene polymers may be used; for example, suspension systems employing organic suspending agents, such as polyvinyl alcohol, N-vinyl pyrrolidine, etc., or inorganic suspending agents, such as bentonite, magnesium trisilicate, etc. The resulting product consistently produces foamed articles having a satin-like surface texture using conventional molding techniques.

It is claimed:

A process for the production of expandable particles of styrene polymer comprising forming an aqueous suspension of particles of styrene polymer, adding thereto 4–30 parts by weight of aliphatic hydrocarbon boiling within the range of 10–100° C. per 100 parts of styrene polymer, maintaining said suspension in contact with said aliphatic hydrocarbon at a temperature of about 90–110° C. for about 1–4 hours so as to incorporate said aliphatic hydrocarbon into said particles of styrene polymer, immediately shock cooling said suspension to 5–25° C. in less than 15 minutes and separating said polymer particles therefrom, thereby producing the polymer particles which, upon expansion to a bulk density of about 1 pound per cubic foot, have surface cells whose size range from 0.1–2 mils.

References Cited by the Examiner

UNITED STATES PATENTS

| | | | |
|---|---|---|---|
| 2,950,261 | 8/60 | Buchholtz et al. | 260—2.5 |
| 2,983,692 | 5/61 | D'Alelio | 260—2.5 |
| 3,001,954 | 9/61 | Buchholtz et al. | 260—2.5 |
| 3,060,138 | 10/62 | Wright | 260—2.5 |
| 3,088,925 | 5/63 | Hall | 260—2.5 |

MURRAY TILLMAN, *Primary Examiner.*

LEON J. BERCOVITZ, JAMES A. SEIDLECK,
*Examiners.*